Figure 1:
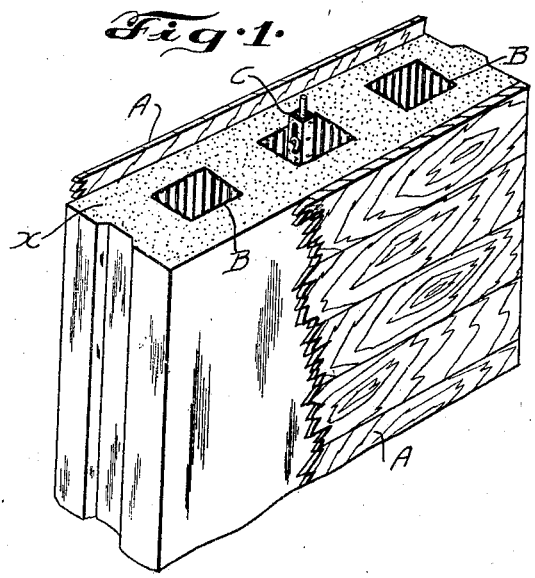

Feb. 2, 1926.

F. A. K. MARX 1,571,424

MOLDING APPARATUS

Filed May 25, 1925

INVENTOR
Frederick A. K. Marx.
By Bakewell & Cornell
ATTORNEYS

Patented Feb. 2, 1926.

1,571,424

UNITED STATES PATENT OFFICE.

FREDERICK A. K. MARX, OF ST. LOUIS, MISSOURI.

MOLDING APPARATUS.

Application filed May 25, 1925. Serial No. 32,655.

*To all whom it may concern:*

Be it known that I, FREDERICK A. K. MARX, a citizen of the United States, residing at St. Louis, Missouri, have invented a certain new and useful Improvement in Molding Apparatus, of which the following is a full, clear, and exact description, such as will enable others skilled in the art to which it appertains to make and use the same.

This invention relates to the manufacture of articles and structures of the kind that are formed from a substance which is put in a mold in a plastic state and then allowed to set or harden.

In instances where the article or structure being formed is to have a hollow space or spaces, it is the usual custom to arrange a core in the mold for each of said spaces, then introduce the plastic substances into the mold, and thereafter remove said core after said substance has set. Due to the fact that the plastic substance contacts with the core and in many cases adheres to same, considearble skill and care have to be exercised in order to prevent the molded article from being fractured by the strain to which it is subjected during the operation of removing the core, and even when great care is exercised in this operation, fine, hair line cracks are liable to form in the molded article, which make it structurally unsafe. If a solid, tapered core is used, it is impracticable to make the molded article more than two or three feet in length, because of this tendency to fracture the artitcle or produce hair line cracks in same during the operation of withdrawing the core and because the diameter of the widest portion of a relatively long, tapered core would take up so much of the internal space of the mold that the walls of the molded article adjacent the widest portion of the core would not be of the proper thickness.

The main object of my invention is to provide a molding apparatus of simple design in which cored articles of symmetrical shape and uniform thickness can be formed quickly and at a low cost.

Another object of my invention is to provide a molding apparatus that will produce a cored article or structure which is sound and structurally safe, the apparatus being so designed that it eliminates the possibility of the molded article being subjected to strains tending to fracture it or from being subjected to frictional pressure tending to produce hair line cracks in said article, as so often occurs in producing cored articles with molding apparatus of the kind now in use.

To this end I have devised a molding apparatus that comprises a mold of any preferred shape and construction and one or more non-rigid cores adapted to be arranged inside of said mold and each composed primarily of a shell constructed of an inexpensive material having some flexibility that is adapted to be left in the molded article after it is completed. Preferably, a collapsible means is arranged inside of the shell so as to support the same, prevent it from collapsing or changing materially from its original condition, give it the same rigidity as a solid core, and because of the flexibility of the shell, hold it absolutely straight or to such alignment as may be desired, when the plastic substance is introduced into the mold. The means just referred to is adapted to be removed from the shell, after the substance from which the article is formed has set or hardened slightly, but in view of the fact that the shell prevents the plastic substance from contacting with and adhering to said means, there is no liability of subjecting the molded article to injurious strains in removing said means. The core shell can be of any preferred shape in cross section and it can be formed from various materials. One material that I have found to be very satisfactory is corrugated cardboard, on account of its low cost; on account of its ability to retain substantially its original shape and form when used in conjunction with an internal supporting means; on account of the fact that it can be sawed easily; and on account of the fact that it has sufficient flexibility to permit the internal supporting means of the shell to be easily withdrawn from same without subjecting the molded article to any injurious results when said article is formed from a substance such as gypsum, which tends to expand and grip the core tightly when it sets. However, various other materials can be used for the shell, such, for example, as plain cardboard, plaster board, beaver board, papier-mâché and material formed from wood pulp products. Various means can be used for internally supporting the core shell without departing from the sporit of my invention, so long as said means is of such design that it will afford sufficient support for the core shell to insure the same retaining substantially its original form, or desired alignment, and is capable of being easily withdrawn from the shell without exerting any strain on the plastic material which would tend to produce fractures, even though not perceptible to the eye, and thereby render the finished product structurally unsafe.

My improved molding apparatus is adapted for various uses, such, for example, as manufacturing structural shapes, building walls, bridges and articles constructed of various kinds of self-hardening, plastic substances. However, it is particularly adapted for use in the manufacture of gypsum articles, on account of the fact that it permits said articles to be made of any preferred dimensions, shape and number of core openings, without liability of fracturing the articles or producing hair line cracks in same in the operation of disengaging the articles from the co-operating parts of the apparatus.

Figure 1 of the drawings is a perspective view, illustrating a molding apparatus constructed in accordance with my invention, used for producing a gypsum block of the general type now used extensively in the construction of partitions and walls of buildings.

Figure 2:
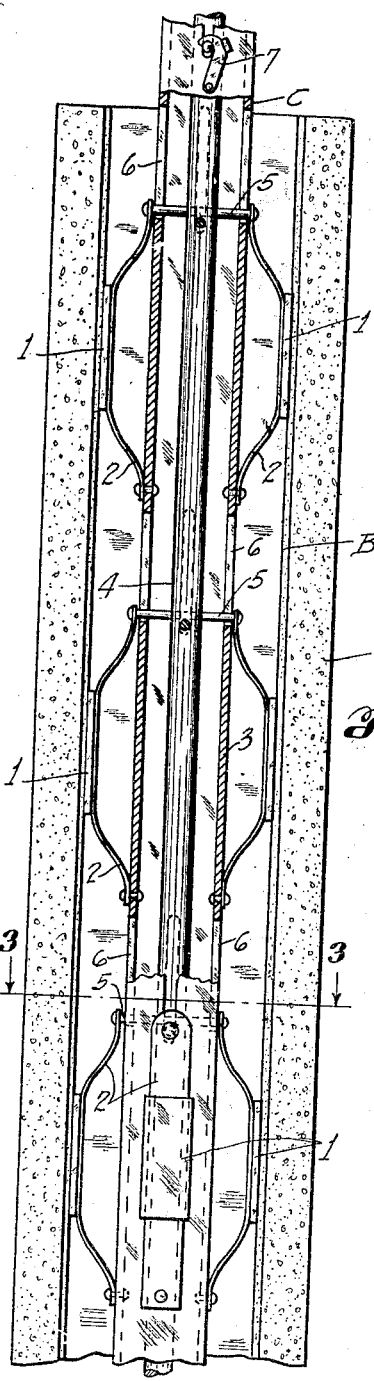
Figure 3:
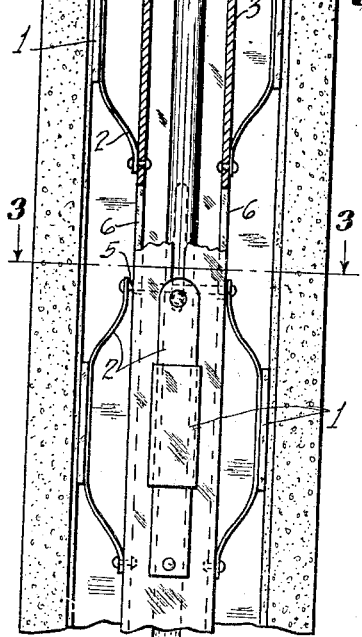
Figure 3:
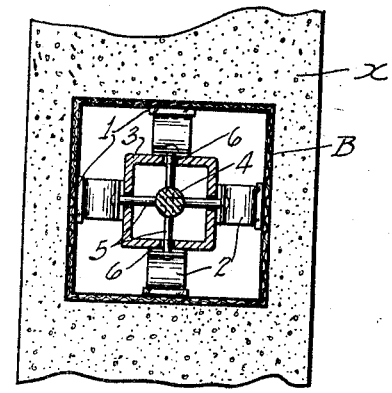

Figure 2 is an enlarged vertical cross sectional view of said molding apparatus, showing one means that can be used for insuring the core shells retaining substantially their original shape and form; and Figure 3 is a top plan view of a portion of the article produced in the apparatus, showing the internal supporting means for the core shell arranged in operative position inside of same.

Referring to the drawings which illustrate the preferred form of my invention, A designates a mold of any preferred shape and construction that is adapted to receive a plastic, self-hardening substance from which an article or structure $x$ is to be formed, such, for example, as a gypsum block or article provided with one or more cored openings. The openings or hollow spaces in said article $x$ are produced preferably by means of core shells B arranged inside of the mold and internally supported when the plastic substance is introduced into the mold. In the embodiment of my invention herein illustrated the core shells are internally supported by supporting structures C, each of which consists of a number of spaced shell engaging devices 1 carried by resilient members 2 which are connected at one end to a supporting member 3 and connected at their opposite end to an actuating member 4 arranged inside of the supporting member 3 and adapted to be moved longitudinally of same in one direction so as to force the devices 1 outwardly into engagement with the core shell B with which they co-operate, and moved longitudinally in the opposite direction to disengage the devices 1 from the shell, thus collapsing the shell supporting means C and permitting it to be withdrawn easily from the shell inside of which it is arranged. The supporting member 3 is herein illustrated as consisting of a hollow member of substantially the same cross-sectional shape as the core shell with which it is used, and the actuating member 4 consists of a rod arranged inside of the member 3 and provided with a plurality of transversely-disposed pins 5 that project outwardly through vertically-disposed, elongated slots 6 in the supporting member 3, said pipe being attached to the upper ends of the spring arms or resilient devices 2 that carry the core shell engaging devices 1. As shown in Figure 2, the supporting member 3 is provided with a plurality of sets of core engaging devices 1 arranged in spaced relation; but, if desired, the material supporting means for each core shell could be constructed so as to support said shell throughout its entire length. Preferably, some suitable means, such for example, as hooks 7 at the upper end of the supporting member 3 are provided for retaining the actuating member 4 after it has been moved longitudinally in a direction to expand the shell supporting means C or cause the shell engaging devices 1 of said means to be forced outwardly into engagement with the shell inside of which said means C is arranged. I wish it to be understood, however, that my invention is not limited to a molding apparatus provided with a collapsible means C of the kind herein illustrated for internally supporting the core shells, as the particular construction of said means is immaterial, so far as my broad idea is concerned. Furthermore, instead of using a collapsible structure to internally support the core shell, it would be possible to support said shell by a pneumatic medium or by a member constructed of rubber.

The core shells B herein illustrated consist of corrugated cardboard tubes of substantially rectangular shape in cross section which are adapted to be arranged inside of the mold A preparatory to introducing the plastic substance into the mold and which are left in the article or structure formed in the mold. Said shells can be of any preferred shape, and as previously stated, they can be constructed from any material which is of sufficiently low cost to justify its use and which is of such a nature that it will retain the plastic substance while said substance is setting and will yield or give slightly in case the plastic substance expands and grips the core, as in the case of articles formed from gypsum.

In producing an article with a molding apparatus embodying my invention the core shells B are first arranged inside of the mold A with the supporting means C for said shells positioned in same, and thereafter the substance from which the article is to be formed is introduced into the mold in a plastic condition. After said substance has set or partly hardened the shell supporting means C are collapsed and withdrawn from the shells B, and thereafter, the finished article is removed from the mold with the shells B left in place and constituting a part of the finished product. With such an apparatus there is little danger of the article being fractured during the operation of making the same, due, of course, to the fact that the shells B which form the hollow spaces or openings in the article are not removed from same, but, on the contrary, are left in the article. The apparatus is inexpensive to construct, it is easy to operate, and as it is only necessary to leave the supporting means C in the shells B for a short period, namely, until the substance in the mold has solidified, the apparatus effects a considerable saving in the time required to produce cored articles from plastic substances. Such an apparatus can be used for producing pre-cast articles, or it can be used for molding a structure that is cast in place.

Having thus described my invention, what I claim as new and desire to secure by Letters Patent is:

1. A molding apparatus for plastic substances, comprising a mold, and a core shell formed of corrugated cardboard or other inexpensive, non-rigid material arranged inside of said mold and adapted to be left in the article or structure formed in the mold.

2. A molding apparatus for plastic substances, comprising a mold, a non-rigid core shell in said mold that is adapted to be left in the article or structure formed in the mold, a plurality of devices inside of said shell for maintaining the shell in substantially its original form, and means for disengaging the devices from the shell so as to enable them to be withdrawn from the shell.

3. A molding apparatus, comprising a mold, a non-rigid core shell in said mold that is adapted to be left in the article or structure formed in the mold, and a collapsible means for internally supporting said shell composed of a supporting member, resilient elements on the exterior of said supporting member connected at one end to said member, shell engaging devices carried by said resilient elements, and a longitudinally movable actuating member inside of said supporting member connected to the opposite end of said resilient elements and adapted to be moved longitudinally in opposite directions to move said shell engaging devices into and out of engagement with the shell.

FREDERICK A. K. MARX.